United States Patent
Ito (10) Patent No.: US 10,122,513 B2
(45) Date of Patent: Nov. 6, 2018

(54) WIRELESS COMMUNICATION SYSTEM, BASE STATION, MOBILE STATION, AND WIRELESS COMMUNICATION METHOD FOR ALLOCATING UPLINK RESOURCES

(71) Applicant: FUJITSU LIMITED, Kawasaki-shi, Kanagawa (JP)

(72) Inventor: Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/227,586

(22) Filed: Mar. 27, 2014

(65) Prior Publication Data

US 2014/0211713 A1      Jul. 31, 2014

Related U.S. Application Data

(63) Continuation of application No. PCT/JP2011/072676, filed on Sep. 30, 2011.

(51) Int. Cl.
H04L 5/00       (2006.01)
H04W 72/12      (2009.01)

(52) U.S. Cl.
CPC .......... *H04L 5/0053* (2013.01); *H04L 5/0048* (2013.01); *H04W 72/1231* (2013.01); *H04W 72/1289* (2013.01)

(58) Field of Classification Search
CPC .......... H04W 72/1231; H04W 72/1289; H04L 5/0053; H04L 5/0048

See application file for complete search history.

(56) References Cited

U.S. PATENT DOCUMENTS

| 2007/0121543 A1 | 5/2007 | Kuchibhotla et al. |
| 2009/0129338 A1 | 5/2009 | Horn et al. |
| 2009/0305716 A1 | 12/2009 | Ono |
| 2010/0020716 A1 | 1/2010 | Kuchibhotla et al. |

(Continued)

FOREIGN PATENT DOCUMENTS

| CA | 2 789 364 A1 | 8/2011 |
| EP | 2 139 122 A1 | 12/2009 |

(Continued)

OTHER PUBLICATIONS

Damnjanovic et al., Extension Carriers for Wireless Communication, U.S. Appl. No. 61/521,558, filed Aug. 2011.*

(Continued)

*Primary Examiner* — Ian N Moore
*Assistant Examiner* — Justin T Van Roie
(74) *Attorney, Agent, or Firm* — Myers Wolin, LLC (57) ABSTRACT

A radio communications system includes a base station and a mobile station configured to perform communication with the base station. The base station includes a selection unit and a first transmission unit. The selection unit selects identification information specifying a resource used by the mobile station for transmission of a signal from among a plurality of resources. The first transmission unit transmits the identification information to the mobile station. The mobile station includes a reception unit and a second transmission unit. The reception unit receives the identification information transmitted by the first transmission unit. The second transmission unit transmits the signal to the base station using the resource specified by the identification information.

11 Claims, 8 Drawing Sheets

(56) References Cited

U.S. PATENT DOCUMENTS

| | | | |
|---|---|---|---|
| 2010/0118773 A1 | 5/2010 | Kawamura et al. | |
| 2010/0142466 A1 | 6/2010 | Palanki et al. | |
| 2011/0269489 A1* | 11/2011 | Khoshnevis | H04L 5/0048 455/507 |
| 2011/0275399 A1* | 11/2011 | Englund et al. | 455/513 |
| 2011/0294439 A1 | 12/2011 | Ofuji et al. | |
| 2012/0051319 A1 | 3/2012 | Kwon et al. | |
| 2012/0099527 A1 | 4/2012 | Ishii | |
| 2012/0113888 A1 | 5/2012 | Takano | |
| 2012/0177090 A1 | 7/2012 | Iwai et al. | |
| 2012/0182949 A1 | 7/2012 | Aiba et al. | |
| 2013/0039296 A1* | 2/2013 | Damnjanovic et al. | 370/329 |
| 2013/0114547 A1 | 5/2013 | Li et al. | |
| 2014/0185569 A1 | 7/2014 | Suzuki et al. | |

FOREIGN PATENT DOCUMENTS

| | | |
|---|---|---|
| EP | 2 276 310 A1 | 1/2011 |
| EP | 2 536 243 A1 | 12/2012 |
| JP | 2007-019835 A | 1/2007 |
| JP | 2007-282021 A | 10/2007 |
| JP | 2009-510975 A | 3/2009 |
| JP | 2009-296537 A | 12/2009 |
| JP | 2010-154102 A | 7/2010 |
| JP | 2010-279017 A | 12/2010 |
| JP | 2011-504057 A | 1/2011 |
| JP | 2011-030017 A | 2/2011 |
| JP | 2011-30118 A | 2/2011 |
| JP | 2011-166412 A | 8/2011 |
| JP | 2013-516943 A | 5/2013 |
| JP | 2013-543287 A | 11/2013 |
| RU | 2009 136 526 A | 4/2011 |
| WO | 2007/044173 A2 | 4/2007 |
| WO | 2009/064932 A2 | 5/2009 |
| WO | 2009/136825 A1 | 11/2009 |
| WO | 2010/134755 A2 | 11/2010 |
| WO | 2011/007583 A1 | 1/2011 |
| WO | 2011/055986 A2 | 5/2011 |
| WO | 2011/055986 A3 | 5/2011 |
| WO | 2011/085402 A2 | 7/2011 |
| WO | 2011/085702 A1 | 7/2011 |

OTHER PUBLICATIONS

Notice of Rejection issued for corresponding Japanese Patent Application No. 2013-535807 dated Dec. 2, 2014 with an English translation.
International search report issued for corresponding international application No. PCT/JP2011/072676, dated Dec. 6, 2011.
3GPP TR 36.814 V9.0.0; 3rd Generation Partnership Project; Technical Specification Group Radio Access Network; Evolved Universal Terrestrial Radio Access (E-UTRA); "Further advancements for E-UTRA physical layer aspects (Release 9)"; Mar. 2010.
ETSI TS 136 211 V10.2.0; LTE; Evolved Universal Terrestrial Radio Access (E-UTRA); "Physical channels and modulation (3GPP TS 36.211 version 10.2.0 Release 10)"; Jun. 2011.
Extended European search report, the supplementary European search report and the European search opinion issued for corresponding European Patent Application No. 11872954.0 dated Feb. 12, 2015.
Notice of Rejection issued for corresponding Japanese Patent Application No. 2013-535807, dated Mar. 17, 2015, with an English translation.
Office Action issued for corresponding Russian Patent Application No. 2014116642 dated Mar. 3, 2015. English translation attached.
Office Action issued by the Korean Intellectual Property Office for corresponding Korean Patent Application No. 10-2014-7007721, dated Apr. 23, 2015, with an English translation.
Office Action issued by the Mexican Institute of Industrial Property for corresponding Mexican Patent Application No. MX/a/2014/003741, dated Apr. 17, 2015, with an English translation.
Patent Examination Report No. 1 issued for corresponding Australian Patent Application No. 2011377681, dated Nov. 27, 2014.
Decision of Rejection issued for corresponding Japanese Patent Application No. 2013-535807 dated Jul. 14, 2015 with a partial English translation.
Office Action issued for corresponding Canadian Patent Application 2,850,305 dated Jul. 27, 2015.
Patent Examination Report No. 1 issued for corresponding Australian Patent Application No. 2015258201 dated Apr. 27, 2016.
Office Action issued for corresponding Canadian Patent Application No. 2,850,305 dated Apr. 14, 2016.
First Notification of Office Action issued by the State Intellectual Property Office of China for corresponding Chinese Patent Application No. 201180073666.4, dated Nov. 7, 2016, with an English translation.
Communication pursuant to Article 94(3) EPC issued by the European Patent Office for corresponding European Patent Application No. 11 872 954.0-1857, dated Nov. 17, 2016.
Notice of Preliminary Rejection issued for corresponding Korean Patent Application No. 10-2016-7002334 dated Mar. 22, 2016 with an English translation.
Office Action issued for corresponding Indonesian Patent Application No. P00 2014 01653, dated Mar. 3, 2017, with an English translation.
Office Action issued by the Japan Patent Office for corresponding Japanese Patent Application No. 2015-203283, dated Nov. 15, 2016, with an English translation.
Office Action issued by the Canadian Intellectual Property Office for corresponding Canadian Patent Application No. 2,850,305, dated Nov. 29, 2017.
Search Report issued by Rospatent Federal Service for Intellectual Property for corresponding Russian Patent Application No. 2017101669/07(002827) dated Jul. 12, 2017, with English Translation.

* cited by examiner

| RRH NUMBER THROUGH WHICH RECEIVED POWER VALUE IS MAXIMUM | 0 | 1 | 2 | 3 | 4 | 5 | 6 | 7 |
|---|---|---|---|---|---|---|---|---|
| g(i) | 0 | 1 | 2 | 3 | 4 | 5 | 6 | 7 |

| CSI-RS IDENTIFIER WITH WHICH RECEIVED POWER VALUE IS MAXIMUM | 0 | 1 | 2 | 3 | 4 | 5 | 6 | 7 |
|---|---|---|---|---|---|---|---|---|
| g(i) | 0 | 1 | 2 | 3 | 4 | 5 | 6 | 7 |

WIRELESS COMMUNICATION SYSTEM, BASE STATION, MOBILE STATION, AND WIRELESS COMMUNICATION METHOD FOR ALLOCATING UPLINK RESOURCES

CROSS-REFERENCE TO RELATED APPLICATION

This application is a continuation application of International Application PCT/JP2011/072676, filed on Sep. 30, 2011, and designating the U.S., the entire contents of which are incorporated herein by reference.

FIELD

The present invention relates to a wireless communication system, a base station, a mobile station, and a wireless communication method.

BACKGROUND

Conventionally, in a system to which a wireless communication system including a long term evolution (LTE) is applied, a base station transmits a control signal for allocating a resource of an uplink direction to a mobile station prior to data reception when the mobile station transmits data to the base station. The mobile station transmits the data and a reference signal (RS) to the base station upon reception of the control signal. The RS is transmitted as one symbol in the same time slot as the data through a physical uplink shared channel (PUSCH). The base station performs channel estimation based on the RS, and demodulates the data received through the PUSCH using an estimation result. The RS is called demodulation RS (DM-RS) because of being used for demodulation of received data.

For example, in the LTE, a Zadoff-Chu (ZC) group is used as a group of the DM-RS, and identification parameters thereof include a group number, a sequence number, a cyclic shift amount, and the like. Among these parameters, the group number and the sequence number in each time slot can be uniquely identified from a cell ID. The cyclic shift amount is specified by the above-described control signal (uplink grant) immediately before the mobile station transmits the data. Note that, if the interval of the cyclic shift is made too small, a plurality of signals may overlap with one another when a large multipath having a large time difference is generated. Therefore, as an upper limit value of the cyclic shift amount, "8" is set, for example, and this value becomes the number of allocatable resources by the base station for transmission of the DM-RS.

Non Patent Document 1: 3GPP TS36.211 V10.2.0 (2011-06)

Non Patent Document 2: 3GPP TR36.814 V9.0.0 (2010-03)

However, the above-described technology has following problems with an increase in the number of mobile stations that perform communication using the same resource in the same cell. That is, in a wireless communication system in which a plurality of remote radio heads (RRHs) is disposed in a macrocell, an antenna of the base station that forms the macrocell and a plurality of antennas included in the RRHs coexist. Therefore, the number of antennas arranged in one cell is increased. Accordingly, the number of mobile stations that perform communication using the same resource (a time and a frequency) in the same cell is increased.

Meanwhile, the number of resources allocated by the base station for transmission of the DM-RS usually requests a total value of the number of layers of multiple input multiple output (MIMO) of the mobile stations that simultaneously perform communication. Therefore, the above-described value "8" may be insufficient as the resources when the mobile stations transmit the DM-RSs to the base station. Further, even when the resources are sufficient, a probability that the same resource is allocated to (conflicts in) a plurality of mobile stations is increased, and there is a possibility that channel estimation accuracy with respect to each mobile station is decreased in the base station that has received the DM-RSs from the plurality of mobile stations using the resource. Since the base station demodulates the data received through the PUSCH using the channel estimation result, the decrease in the channel estimation accuracy may be a cause that impedes normal demodulation of the received data.

SUMMARY

To solve the above problem and attain the object, a radio communications system disclosed in this application, according to an aspect, includes a base station and a mobile station configured to perform communication with the base station. The base station includes a selection unit and a first transmission unit. The selection unit selects identification information specifying a resource used by the mobile station for transmission of a signal from among a plurality of resources. The first transmission unit transmits the identification information to the mobile station. The mobile station includes a reception unit and a second transmission unit. The reception unit receives the identification information transmitted by the first transmission unit. The second transmission unit transmits the signal to the base station using the resource specified by the identification information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, a wireless communication system, a base station, a mobile station, and a wireless communication method disclosed in the present application will be described in detail with reference to the drawings. Note that the wireless communication system, the base station, the mobile station, and the wireless communication method disclosed in the present application are not limited by the embodiments.

Figure 1:
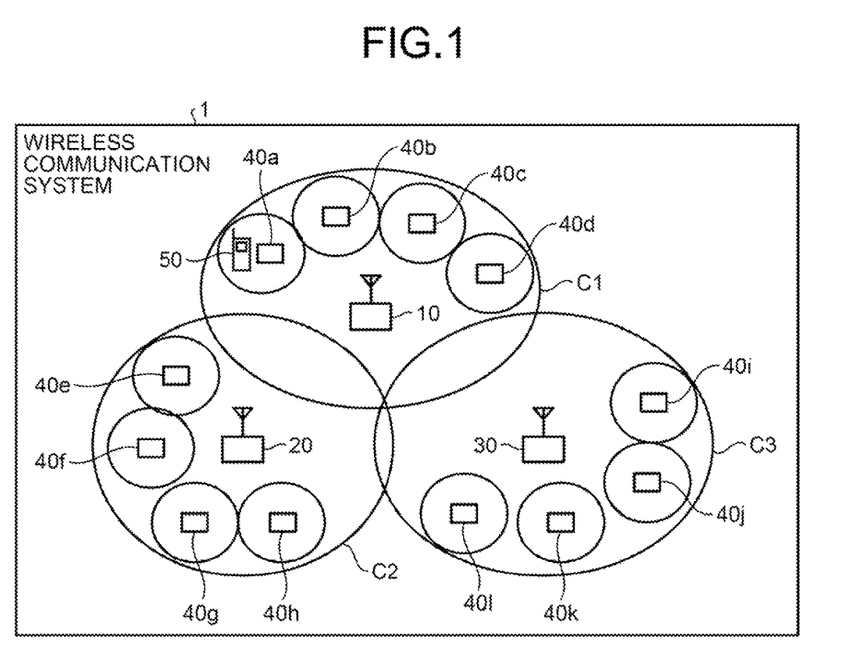
FIG. 1 is a diagram illustrating arrangement of cells and RRHs in a wireless communication system.

FIG. 1 is a diagram illustrating arrangement of cells C1 to C3 and RRHs 40a to 40l in a wireless communication system 1. As illustrated in FIG. 1, in the wireless communication system 1, a plurality of base stations 10, 20, and 30 forms the plurality of cells C1, C2, and C3. The plurality of remote radio heads (RRHs) 40a to 40l including antennas is disposed in the cells C1, C2, and C3. In the RRHs 40a to 40l, the antennas and radio frequency (RF) units, and control units such as base band processing units are arranged in different positions from one another. The antennas and the radio frequency (RF) units are respectively arranged at end parts of the cells C1, C2, and C3 of the base stations, and the control units are arranged at approximately the same positions as the base stations 10, 20, and 30. The control units of the RRHs 40a to 40l are integrally connected with, or are connected with, in a wired manner, the base stations 10, 20, and 30 that form the cell C1, C2, and C3 where the RRHs 40a to 40l exist, and are capable of performing cooperative scheduling with the base stations 10, 20, and 30. Further, in the present embodiment, a mobile station 50 exists in the RRH 40a under the control of the base station 10.

Note that, in FIG. 1, the number of RRHs disposed in each of the cell C1, C2, and C3 is four, as an example. However, the number of RRHs per one cell is arbitrary, and may be ten or more, for example. Further, the position where the RRH is installed is not limited to the vicinity of the end of the cell, and is arbitrary. In the present embodiment, "8" is set as the upper limit value of the cyclic shift amount in the wireless communication system 1. Therefore, each of the base stations 10, 20, and 30 can allocate "8" resources per one cell for transmission of the DM-RS.

Figure 2:
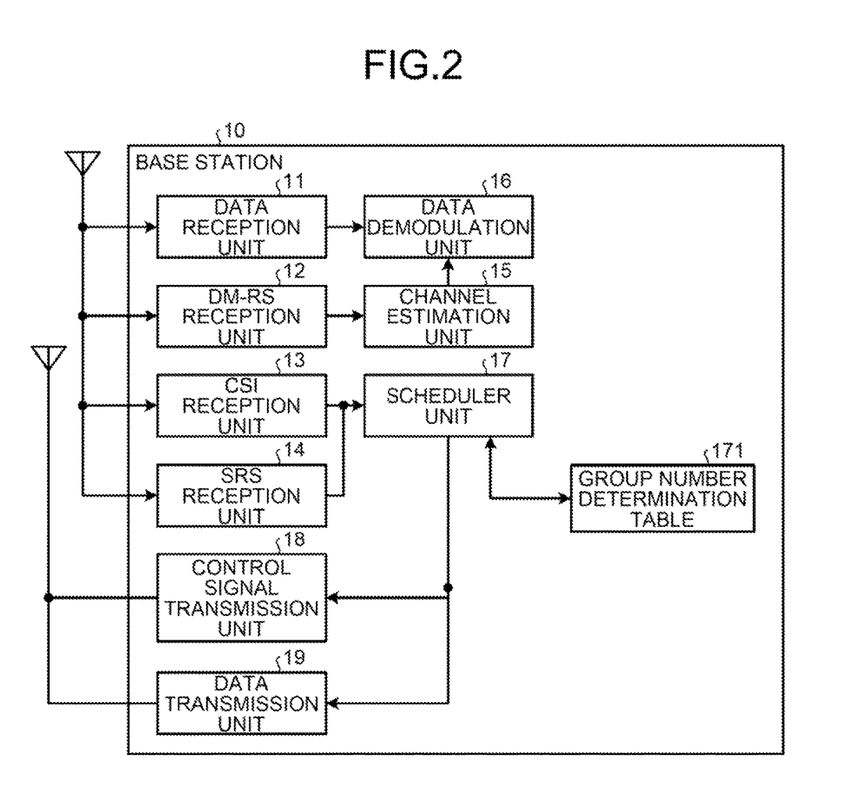
FIG. 2 is a diagram illustrating a functional configuration of a base station.

FIG. 2 is a diagram illustrating a functional configuration of the base station 10. As illustrated in FIG. 2, the base station 10 includes a data reception unit 11, a DM-RS reception unit 12, a channel state information (CSI) reception unit 13, a sounding reference signal (SRS) reception unit 14, a channel estimation unit 15, and a data demodulation unit 16. Further, the base station 10 includes a scheduler unit 17, a group number determination table 171, a control signal transmission unit 18, and a data transmission unit 19. These configuration elements are unidirectionally or bidirectionally connected so as to be able to input/output signals and data.

The data reception unit 11 receives data of the uplink direction transmitted from the mobile station 50 through the PUSCH. The DM-RS reception unit 12 receives the DM-RS that is referred when channel estimation is performed with respect to the PUSCH. The CSI reception unit 13 receives a CSI value of each of the RRHs 40a to 40d measured by the mobile station 50. The SRS reception unit 14 receives an SRS transmitted from the mobile station 50, and measures reception quality of each of the RRHs 40a to 40d using the SRS. The channel estimation unit 15 executes the channel estimation with respect to the PUSCH using the DM-RS as a reference signal. The data demodulation unit 16 demodulates the data received from the mobile station 50 based on a channel estimation result by the channel estimation unit 15.

The scheduler unit 17 identifies the RRH to be used by the mobile station 50 for transmission of the DM-RS from among the RRHs 40a to 40d based on the CSI or the measurement result of the reception quality using the SRS, and selects a group number index i based on the number of the RRH. The control signal transmission unit 18 transmits a group number u of the DM-RS to the mobile station 50 prior to reception of the reception quality. Further, the control signal transmission unit 18 transmits the selected group number index i to the mobile station 50 as identification information that specifies a resource to be used by the mobile station 50 for transmission of the DM-RS. The data transmission unit 19 transmits data of a downlink direction to the mobile station 50 in response to a request from the mobile station 50.

Figure 3A:
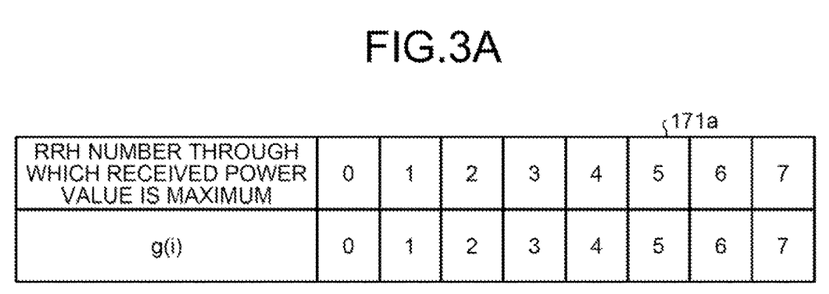
FIG. 3A is a diagram illustrating a data storage example in a group number determination table using an RRH number.

The scheduler unit 17 refers to the group number determination table 171, and determines the group number u. FIG. 3A is a diagram illustrating a data storage example in a group number determination table 171a using the RRH number. As illustrated in FIG. 3A, in the group number determination table 171a, data that is referred when the scheduler unit 17 determines the group number u through the RRH number based on the CSI is stored. The group number determination table 171a includes an RRH number storage region and a g(i) storage region. In the group number determination table 171a, values of "0" to "7" are held as the RRH numbers so that the value of the g(i) used for calculation of the group number u to be used by the mobile station can be determined when the RRH number through which a received power value becomes maximum in the base station is uniquely determined. The received power in the base station can be obtained such that the SRS transmitted from the mobile station 50 is measured by the SRS reception unit 14. Further, as the g(i), the values of "0" to "7" are set.

Figure 3B:
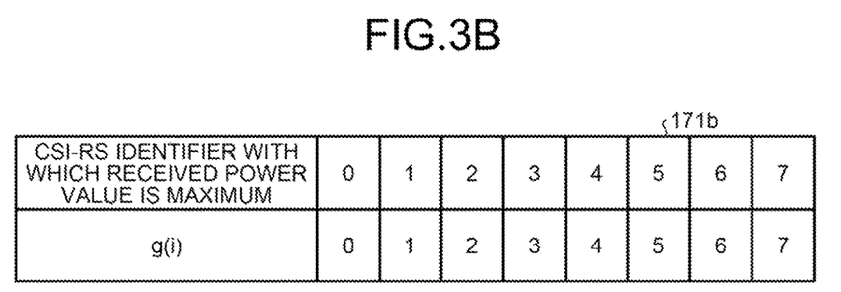
FIG. 3B is a diagram illustrating a data storage example in a group number determination table using a CSI-RS identifier.

As another aspect, the scheduler unit 17 can directly identify the g(i) from a CSI-RS identifier by referring to a group number determination table 171b. FIG. 3B is a diagram illustrating a data storage example in the group number determination table 171b using a CSI-RS identifier. As illustrated in FIG. 3B, in the group number determination table 171b, data that is referred when the scheduler unit 17 determines the group number u based on the CSI is stored. The group number determination table 171b includes a CSI-RS identifier storage region and a g(i) storage region. In the CSI-RS identifier storage region, values of "0" to "7" are held as the CSI-RS identifier, and in the g(i) storage region, values of "0" to "7" are held as parameters g(i) of the group number u. Accordingly, the scheduler unit 17 can determine the value of the g(i) to be used by the mobile station when the CSI-RS identifier with which a received power value or a received signal-to-interference plus noise power ratio (SINR) in the mobile station becomes maximum is uniquely determined.

While the functional configuration of the base station 10 has been described, functional configurations of other base stations 20 and 30 are similar to that of the base station 10, and therefore, description of details thereof is omitted.

Figure 4:
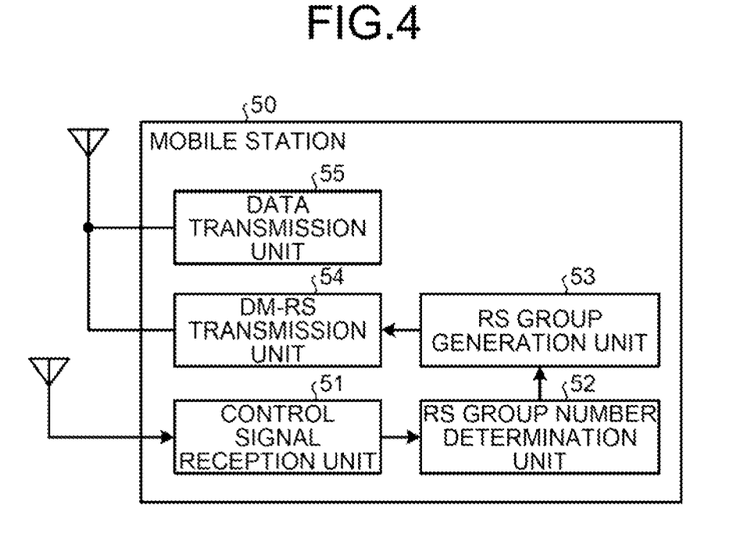
FIG. 4 is a diagram illustrating a functional configuration of a mobile station.

FIG. 4 is a diagram illustrating a functional configuration of the mobile station. As illustrated in FIG. 4, the mobile station 50 includes a control signal reception unit 51, an RS group number determination unit 52, an RS group generation unit 53, a DM-RS transmission unit 54, and a data transmission unit 55. These configuration elements are unidirectionally or bidirectionally connected so as to be able to input/output signals and data. The control signal reception unit 51 receives, from the base station 10, the group numbers u of a plurality of DM-RSs, and receives the group number index i indicating which group number u from among the group numbers u of the plurality of DM-RSs is to be used. The RS group number determination unit 52 determines the DM-RS group number used for generation of a group of the DM-RS based on the group number index i input from the control signal reception unit 51. The RS group generation unit 53 generates a DM-RS group, for which the resource to be used for transmission has been specified, using the DM-RS group number input from the RS group number determination unit 52. The DM-RS transmission unit 54 transmits a signal of the generated DM-RS group to the base station 10 using the resource specified by the group number index i. The data transmission unit 55 transmits data of the uplink direction to the base station 10 through the PUSCH to be subjected to channel estimation by referring to the DM-RS transmitted together with the data.

Figure 5:
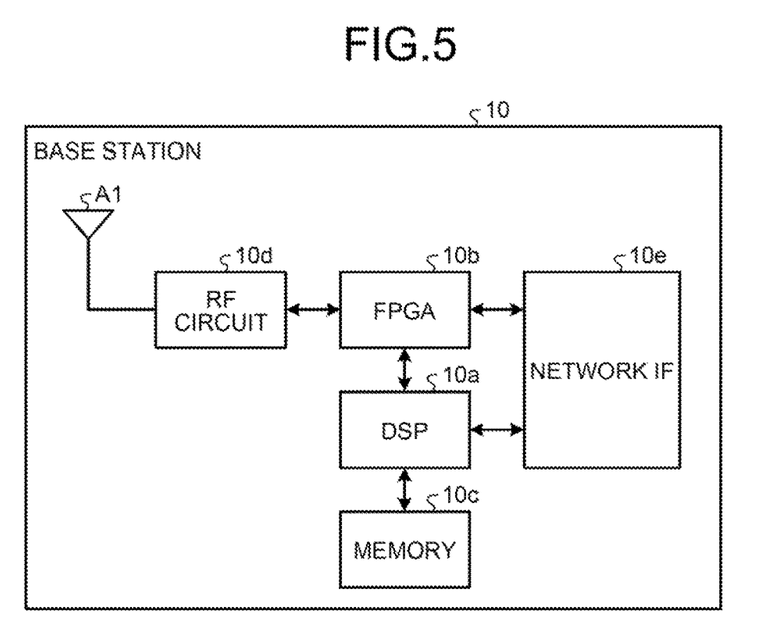
FIG. 5 is a diagram illustrating a hardware configuration of a base station.

FIG. 5 is a diagram illustrating a hardware configuration of the base station 10. As illustrated in FIG. 5, the base station 10 includes, as configuration elements of the hardware, a digital signal processor (DSP) 10*a*, a field programmable gate array (FPGA) 10*b*, a memory 10*c*, a radio frequency (RF) circuit 10*d*, and a network interface (IF) 10*e*. The DSP 10*a* and the FPGA 10*b* are connected so as to be able to input/output various signals and data through the network IF 10*e* such as a switch. The RF circuit 10*d* includes an antenna A1. The memory 10*c* is configured from, for example, a random access memory (RAM) such as a synchronous dynamic random access memory (SDRAM), a read only memory (ROM), or a flash memory. The channel estimation unit 15 and the scheduler unit 17 are realized by integrated circuits such as the DSP 10*a* and the FPGA 10*b*. The data reception unit 11, the DM-RS reception unit 12, the CSI reception unit 13, the SRS reception unit 14, the data demodulation unit 16, the control signal transmission unit 18, and the data transmission unit 19 are realized by the RF circuit 10*d*. The group number determination table 171 is realized by the memory 10*c*. While the hardware configuration of the base station 10 has been described, hardware configurations of other base stations 20 and 30 are similar to that of the base station 10, and therefore, detailed description thereof is omitted.

Figure 6:
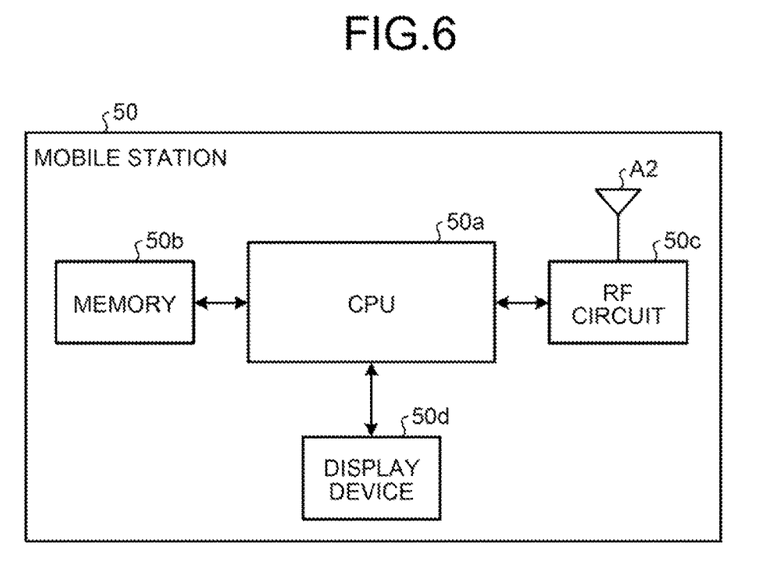
FIG. 6 is a diagram illustrating a hardware configuration of the mobile station.

Further, the above-described mobile station 50 is realized by a mobile phone, for example, in a physical sense. FIG. 6 is a diagram illustrating a hardware configuration of the mobile station 50. As illustrated in FIG. 6, the mobile station 50 includes, in a hardware sense, a central processing unit (CPU) 50*a*, a memory 50*b*, an RF circuit 50*c* including an antenna A2, and a display device 50*d* such as a liquid crystal display (LCD). The memory 50*b* is configured from a RAM such as SDRAM, a ROM, or a flash memory, for example. The control signal reception unit 51, the DM-RS transmission unit 54, and the data transmission unit 55 are realized by the RF circuit 50*c*. Further, the RS group number determination unit 52 and the RS group generation unit 53 are realized by, for example, an integrated circuit such as the CPU 50*a*.

Next, an operation of the wireless communication system 1 in the present embodiment will be described. As a premise of the description, the DM-RS is a known signal (pilot signal) used for the channel estimation for demodulating the data transmitted through the PUSCH. Since a data array of the DM-RS is described in 3GPP (TS36.211 Chapter 5.5.1), description of details thereof is omitted. The DM-RS group is defibed by the group number u, a sequence number v, and a cyclic shift amount α. Thirty types of the group number u are defined, and two types of the sequence number v are defined. While the values of the numbers u and v in each time slot are uniquely determined from the cell ID in the conventional technology, the group number u of the numbers u and v is set not to conflict with one another even if a plurality of antennas exists in the same cell in the present embodiment. In contrast, the cyclic shift amount a corresponds to the amount by which the DM-RS group is cyclicly shifted on the time axis, and is notified from the base station 10 to the mobile station by a control signal of the downlink direction. Up to eight types of the cyclic shift amount a can be specified. The DM-RS group is mapped to each sub carrier in ascending order of sub carrier numbers.

Figure 7:
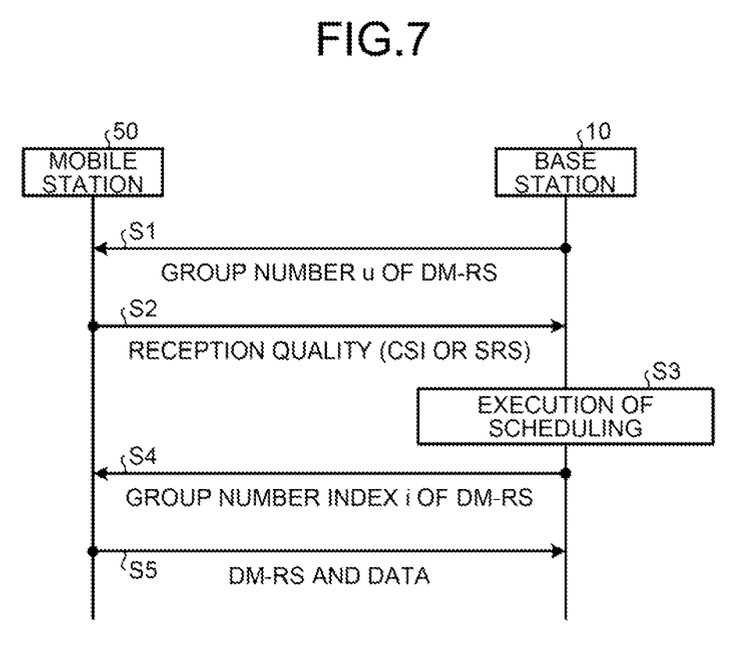
FIG. 7 is a sequence diagram for describing an operation of the wireless communication system.

Description of the operation below will be made on an assumption that the mobile station 50 exists in the cell C1 formed by the base station 10, and performs communication with the base station 10 through a wireless channel. FIG. 7 is a sequence diagram for describing an operation of the wireless communication system 1.

In S1, the base station 10 transmits the group number u of the DM-RS to the mobile station 50. The group number u of the DM-RS is not uniquely determined from the cell ID like the conventional technology, and the base station 10 specifies the resource for PUSCH RS to the mobile station 50. The group number u of the DM-RS is specified from among thirty types of 0 to 29, and the base station 10 selects four types therefrom, for example, and notifies the mobile station 50 of mapping information to the four types of the group numbers (indexes 0 to 3). For example, in the LTE, group hopping changed in each time slot is defined in the group number u of the DM-RS, and the base station 10 can specify the group number u. The specifying of the group number u is performed according to the existing 3GPP specification (TS36.211 5.5.1.3), and therefore, description of details thereof is omitted. In the present embodiment, the base station 10 specifies the group number u of the DM-RS further using the index i with following Expression (1).

$$u = (f_{gh}(n_s) + f_{ss} + g(i)) \bmod 30 \qquad (1)$$

Here, the g(i) that is a parameter of the group number u is a function defined in advance so that a different u is calculated when i takes a different value, and for example, the g(i)=i may be employed. The base station 10 notifies the mobile station 50 of a plurality of group numbers u that can be used by notifying the mobile station 50 that four types of values 0 to 3 can be taken as i in Expression (1), as described above. Alternatively, it is possible that Expression (1) and the values of i that can be taken are determined in the specification in advance, and the base station 10 and the mobile station 50 share the values, so that the step of S1 can be omitted. The group number u calculated at this time is notified to the mobile station 50.

In S2, the mobile station 50 notifies the base station 10 of the reception quality of the wireless channel. The reception quality (channel quality) notified at this time may be the CSI indicating the reception quality of the downlink direction, or may be the SRS used for measuring the reception quality of the uplink direction by the base station 10. Further, the mobile station 50 may notify both of the CSI and the SRS.

The CSI is measured by the mobile station 50 based on a CSI-reference signal (CSI-RS) transmitted from the base station 10 through the RRH at a predetermined period. The CSI includes a channel quality indicator (CQI), a rank indicator (RI), and a precoding matrix index (PMI). For example, in coordinated multi point transmission/reception (CoMP) of the LTE, a plurality of antenna ports is defined, and the CSI-RS is transmitted from each antenna port of the base station 10. Further, the wireless communication system 1 can allocate the antenna port to each of the RRHs 40*a* to

40*d* (see FIG. 1). In this case, the mobile station measures the quality of a signal transmitted from each antenna port, and transmits a measurement result thereof to the base station 10 as the CSI. Accordingly, the base station 10 can estimate around which RRH of the RRHs 40*a* to 40*d* each mobile station is positioned. Meanwhile, the SRS is a signal transmitted from the mobile station to the base station 10. Each of the RRHs 40*a* to 40*d* receives the signal, and the base station 10 can estimate around which RRH of the RRHs 40*a* to 40*d* each mobile station is positioned by comparing values of received power in the RRHs 40*a* to 40*d*. As described above, the base station 10 can identify the RRH used for determination of the group number u by any of the CSI and the SRS.

In S3, the base station 10 performs scheduling with respect to the mobile station 50 based on the reception quality notified in S2. That is, the base station 10 sets an index of the group numbers to be used in each RRH, in advance, identifies the RRH that the mobile station 50 approaches, and allows the mobile station to use the resource of the group number u corresponding to the RRH, by the above-described technique. At this time, when the base station 10 specifies different group numbers between adjacent RRHs, the conflict between mobile stations especially having a high possibility of conflict of a use resource is avoided, and the accuracy of the channel estimation using the DM-RS when the mobile station transmits an uplink signal is improved.

In S4, the base station 10 transmits a control signal of uplink grant through an enhanced-dedicated physical control channel (E-DPCCH). The control signal includes the index i of the group number u determined in S3, and the mobile station 50 can specify the resource to be used for transmission of the DM-RS based on the index i.

Note that, in S4, the indexes i (for example, eight patterns) of the group number u are transmitted, which have less patterns falling within a range in which the conflict of the use resource between the mobile stations can be avoided, rather than the group numbers u (for example, thirty patterns) having many patterns. Accordingly, the base station 10 can reduce the number of bits used for transmission of the control signal. However, since it is enough as long as the mobile station 50 can identify the resource, the base station 10 may transmit (notify) the group number u itself instead of the index i of the group number u. Accordingly, a time and a load associated with processing in which the base station 10 narrows down the group number u can be reduced. Further, the E-DPCCH is used for transmission of the control signal. However, the transmission method is not limited to it, and a method of inserting the control signal to a media access control (MAC) element or a method of notifying the control signal by a radio resource control (RRC) message of an upper layer may be used.

In S5, the mobile station 50 generates the DM-RS to the base station 10 based on the index i of the group number u included in the control signal transmitted in S4, and transmits the DM-RS to the base station 10 together with the data. The resource of the number of layers of the MIMO of the mobile station 50 is used for the transmission of the DM-RS, and the resource used at this time is a resource specified by the base station 10 using the group number index. Therefore, the use resource is not conflicted between the mobile station 50 and another mobile station even if the mobile station 50 uses a plurality of resources. In other words, the mobile station 50 can transmit the DM-RS using a resource exclusive for the own station. Therefore, the base station 10 can perform the channel estimation with respect to the mobile station 50 in a highly precise manner. As a result, the base station 10 can demodulate the data received through the PUSCH in a normal manner.

Figure 8:
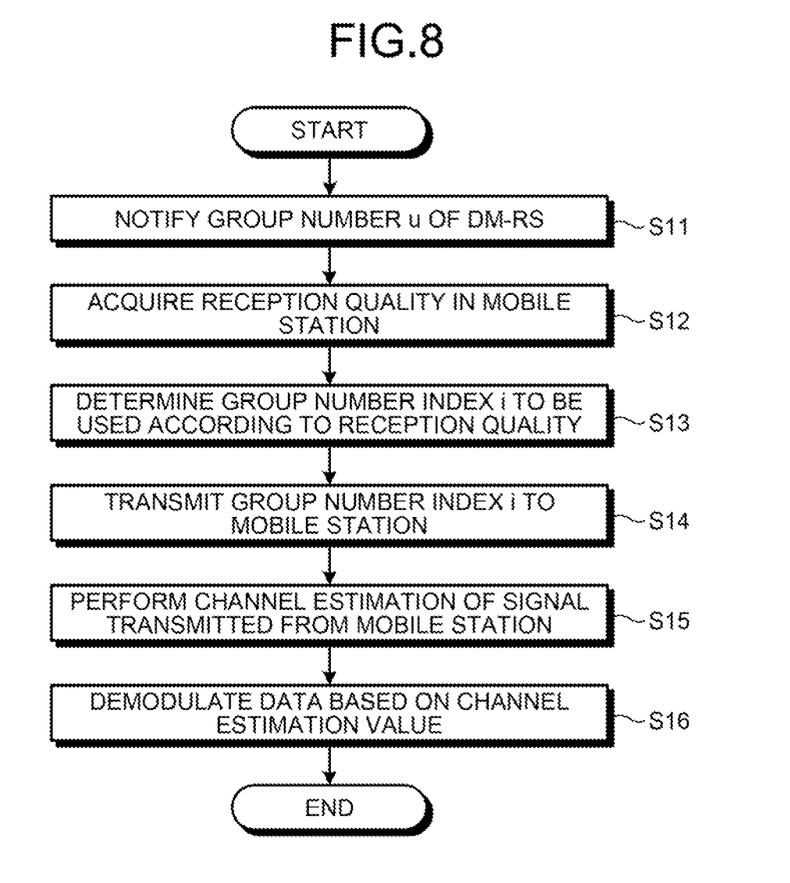
FIG. 8 is a flowchart for describing an operation of the base station.

Next, respective operations of the base station 10 and the mobile station 50 will be described with reference to FIGS. 8 and 9. FIG. 8 is a flowchart for describing an operation of the base station 10. In S11, the control signal transmission unit 18 of the base station 10 notifies the mobile station 50 of the group numbers u of the plurality of DM-RSs. In S12, the CSI reception unit 13 or the SRS reception unit 14 acquires the reception quality in the mobile station 50. In S13, the scheduler unit 17 identifies an RRH through which the received power value in the mobile station 50 is maximum based on the reception quality (the CSI or the SRS) obtained in S12, and determines the group number index i to be used for allocation of a resource through the RRH.

Here, the processing of S13 executed by the scheduler unit 17, that is, processing in which the base station 10 determines the group number u based on the CSI of the mobile station 50 will be described in detail. The base station 10 transmits the above-described CSI-RS to the mobile station 50 from the RRHs 40*a* to 40*d* under control. A "CSI-RS identifier" is included in the CSI-RS as an identifier different in each RRH. The mobile station 50 measures the reception quality for each CSI-RS identifier, and reports a measurement result thereof to the base station 10. A correspondence relationship between the CSI-RS identifiers and the RRHs under control is held in the base station 10. Therefore, the base station 10 can detect from which RRH the received power or the received SINR value is maximum by comparing the CSIs of the CSI-RSs corresponding to the CSI-RS identifiers. The RRH through which the received power value or the received SINR value becomes maximum value is estimated to be an RRH closest to the mobile station 50, and therefore, the RRH has a high possibility of being used as a receiver of a signal of the uplink direction. Therefore, it is desirable that the base station 10 uses the group number u corresponding to the RRH through which the received power value takes the maximum value, and thus, the resource, when receiving the DM-RS from the mobile station 50. Therefore, the scheduler unit 17 refers to the group number determination table 171*a* held in advance, and identifies the g (i) for obtaining the group number u to be used by the mobile station 50 from among the RRH numbers of the RRHs through which the received power value takes the maximum value. The scheduler unit 17 assigns the g (i) to the above-described Expression (1) of the group number u to determine the group number u. Accordingly, the group number u specific to the RRH to be used by the mobile station 50 for transmission of the DM-RS is allocated to the mobile station 50.

Further, the correspondence relationship between the RRH number and the CSI-RS identifier is shared between the base station 10 and the RRHs 40*a* to 40*d* in advance. Therefore, the base station 10 may refer to the group number determination table 171*b* when determining the group number u. That is, in the group number determination table 171*b*, the CSI-RS identifier with which the received power value or the received SINR takes the maximum value, and the g (i) used for obtaining the group number u are associated with each other. Therefore, the scheduler unit 17 can identify the g (i) used for obtaining the group number u to be used by the mobile station 50 without through the RRH number by detecting the CSI-RS identifier with which the received power value or the received SINR value takes the maximum value from the CSI-RS identifier included in the CSI-RS. The scheduler unit 17 then assigns the g (i) in the above-described Expression (1) of the group number u to determine the group number u. Accordingly, the group number u specific to the RRH to be used by the mobile station 50 for transmission of the DM-RS is allocated to the mobile station 50.

Note that, while an example in which the base station 10 uses the CSI-RS and the CSI as the reception quality has been described in the above description, the group number u can be determined using a similar technique when the SRS is used.

In S14, the control signal transmission unit 18 of the base station 10 transmits the group number index i determined in S13 to the mobile station 50. In S15, the channel estimation unit 15 performs the channel estimation with respect to the DM-RS received by the DM-RS reception unit 12 based on the DM-RS group information transmitted to the mobile station 50. In S16, the data demodulation unit 16 demodulates the data received by the data reception unit 11 based on a channel estimation result in S15.

Figure 9:
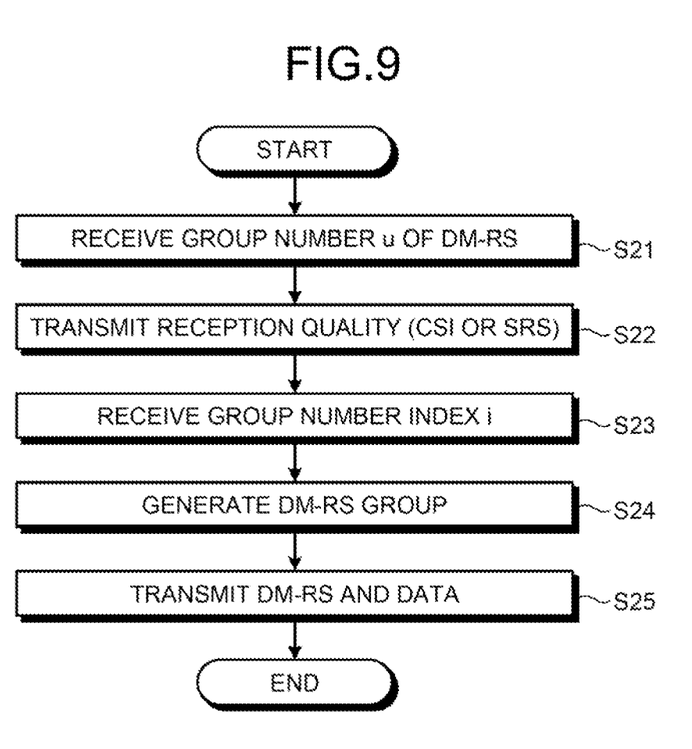
FIG. 9 is a flowchart for describing an operation of the mobile station.

FIG. 9 is a flowchart for describing an operation of the mobile station 50. In S21, the control signal reception unit 51 of the mobile station 50 receives the group numbers u of a plurality of DM-RSs from the base station 10. In S22, the DM-RS transmission unit 54 transmits the CSI or the SRS to the base station 10 as the reception quality in the mobile station 50. In S23, the control signal reception unit 51 receives the group number index i that indicates which group number u from among the group numbers u of the plurality of DM-RSs received in S21 is to be used. In S24, the RS group generation unit 53 generates a DM-RS group of the uplink direction using the group number index i received in S23. In S25, the DM-RS transmission unit 54 transmits the DM-RS to the base station 10, and the data transmission unit 55 transmits the data to the base station 10. Accordingly, the mobile station 50 can exclusively use the specified resource when transmitting the DM-RS of the own station to the base station 10.

As described above, the wireless communication system 1 includes the base station 10 and the mobile station 50 that performs communication with the base station 10. The base station 10 performs communication with the mobile station 50. The base station 10 includes the scheduler unit 17 and the control signal transmission unit 18. The scheduler unit 17 selects the identification information (group number index i) that specifies the resource to be used by the mobile station 50 for transmission of a signal (DM-RS) from among a plurality of resources. The control signal transmission unit 18 transmits the identification information to the mobile station 50. The mobile station 50 includes the control signal reception unit 51 and the DM-RS transmission unit 54. The control signal reception unit 51 receives the identification information transmitted from the control signal transmission unit 18. The DM-RS transmission unit 54 transmits the signal to the base station 10 using the resource specified by the identification information. The base station 10 may further include the DM-RS reception unit 12 that receives the signal transmitted from the mobile station 50 using the identification information.

Further, the scheduler unit 17 may select the identification information based on the reception quality in the base station 10. The reception quality is, for example, a value indicated by the CSI measured by the mobile station 50, and is, for example, a value measured by the base station 10 using the SRS. There is a higher possibility that the RRH is positioned closer to the mobile station 50 as the reception quality in the mobile station 50 is higher. Therefore, when the scheduler unit 17 selects the identification information based on the reception quality in the base station 10, different identification information can be selected according to the position of the mobile station that transmits the signal through the RRH. Further, the resource is determined by the identification information. Therefore, when the scheduler unit 17 allocates the different identification information for each mobile station having a different connection destination RRH, use of the same resource by a plurality of mobile stations (conflict) can be avoided, and the mobile station can exclusively use the resource.

Further, the above-described signal is a DM-RS used for the channel estimation that is executed when the base station 10 demodulates the data received from the mobile station through the PUSCH. The base station 10 performs the channel estimation with respect to the PUSCH that is a channel for data transmission by referring to the DM-RS. Therefore, when the mobile station 50 transmits the DM-RS using the resource exclusively used for the own station, the conflict with the DM-RS from another mobile station cannot occur in the resource, and the base station 10 can perform highly precise channel estimation based on the accurate DM-RS. As a result, the base station 10 can demodulate the received data based on an accurate channel estimation value in a normal manner.

As described above, the base station 10 prepares the group numbers of a plurality of PUSCH DM-RSs in advance, and notifies which DM-RS resource is to be used by the mobile station 50 to transmit the DM-RS when transmitting a control signal of the downlink direction. Accordingly, in the wireless communication system 1, the base station 10 can allocate different DM-RS resources to the mobile stations. In other words, the base station 10 can allocate an exclusive resource to each mobile station when transmitting the control signal (ULgrant). Therefore, even if the number of the mobile stations that performs communication using the same resource (the time and the frequency) in the same cell is increased like the wireless communication system 1 including the RRH, the situation in which the resources become insufficient when the mobile stations transmit the DM-RSs can be avoided. As a result, the number of mobile stations with which the base station 10 including a plurality of RRHs can simultaneously perform communication is increased, and the communication capacity of the entire system can be increased.

Note that, while an aspect in which the base station 10 specifies the group number of the DM-RS of the PUSCH or the index thereof has been described, an object to be generated of a group by the group number is not limited to the DM-RS of the PUSCH. For example, the technology regarding the wireless communication system 1 is applicable to the signal or the data for which the group generation by the group number is executed, like the DM-RS of a physical uplink control channel (PUCCH), the data unit of the of the PUCCH, or the SRS. Therefore, the group number u and the group index i for determining the resource are not limited to the number of the RS of the data channel (for example, the PUSCH), and may be the number of an RS of a control channel (for example, the PUCCH). Further, the group number u and the group number index i may be the number used for generation of the data unit, which is obtained as a result of demodulation of the RS of the control channel, or the number of the SRS.

Further, the group number specified by the base station 10 is based on the closest RRH 40a specified by the position of the mobile station 50. Therefore, the base station 10 can use the same group number regardless of the type of the channel as long as the mobile station 50 does not move. Therefore, the base station 10 can use (divert) the number specified about a certain channel (the PUSCH or the PUCCH) to another channel for a predetermined period.

While, in the above-described embodiment, the description has been given, assuming a mobile phone, a smart phone, or a personal digital assistant (PDA) as the mobile station, the present invention is not limited to the mobile station, and is applicable to various communication devices that perform communication with the base station.

Further, the configuration elements of the base station 10 illustrated in FIG. 2 are not necessarily physically configured like the drawing. That is, specific forms of distribution/integration of the devices are not limited to the drawing, and a part or all of the forms may be functionally or physically distributed/integrated according to various loads, a use status, or the like, in an arbitrary unit. For example, the data reception unit 11 and the data transmission unit 19, or the CSI reception unit 13 and the SRS reception unit 14 are respectively integrated in single configuration elements. In contrast, the scheduler unit 17 may be distributed to a part that identifies the above-described g(i) and a part that determines the group number u. Similarly, the configuration elements of the mobile station 50 illustrated in FIG. 4 are not necessarily configured like the drawing. Further, the memories 10c and 50b may be connected as external devices of the base station 10 and the mobile station 50 through the network or a cable.

According to one aspect of a wireless communication system disclosed in the present application, an effect of effectively using a resource.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
   a base station; and
   a mobile station configured to perform communication with the base station,
   wherein the base station includes
   a processor configured to select identification information, which is allocated for the mobile station, specifying a resource from among a plurality of resources to allocate a dedicated signaling resource to be used by the mobile station for transmission of an uplink signal and
   a transmitter configured to transmit a downlink signal to the mobile station, wherein the downlink signal includes the identification information specifying the dedicated signaling resource, and wherein
   the mobile station includes
   a receiver configured to receive the downlink signal transmitted by the base station and determine the dedicated signaling resource based on the identification information, wherein the dedicated signaling resource is an uplink resource, and
   a transmitter configured to determine a parameter which is used for generating a reference signal sequence by using the identification information, and transmit the reference signal sequence generated by using the parameter to the base station using the dedicated signaling resource, wherein
   the parameter is associated with a group number of the reference signal sequence, and wherein
   the group number indicated by a group number index is a number used for generation of a data unit, the group number obtained as a result of demodulation of a reference signal (RS) of a control channel, and the group number is based on the closest remote radio head (RRH) specified by a position of the mobile station so that the base station uses the same group number regardless of a type of a channel as long as the mobile station does not move.

2. The wireless communication system according to claim 1, wherein the processor is further configured to select the identification information based on reception quality in the base station.

3. The wireless communication system according to claim 2, wherein the reception quality is a value indicated by channel state information (CSI) measured by the mobile station.

4. The wireless communication system according to claim 2, wherein the reception quality is a value measured by the base station using a sounding reference signal (SRS).

5. A base station comprising:
   a processor configured to select identification information, which is allocated for a mobile station, specifying a resource from among a plurality of resources to allocate a dedicated signaling resource to be used by a mobile station for transmission of an uplink signal;
   a transmitter configured to transmit a downlink signal to the mobile station wherein the downlink signal includes the identification information specifying the dedicated signaling resource, wherein the dedicated signaling resource is an uplink resource; and
   a receiver configured to receive the uplink signal transmitted from the mobile station, the uplink signal transmitted using the dedicated signaling resource, wherein
   a parameter is used for generating a reference signal sequence by using the identification information and is associated with a group number of the reference signal sequence, and wherein
   the group number indicated by a group number index is a number used for generation of a data unit, the group number obtained as a result of demodulation of a reference signal (RS) of a control channel, and the group number is based on the closest remote radio head (RRH) specified by a position of the mobile station so that the base station uses the same group number regardless of a type of a channel as long as the mobile station does not move.

6. A mobile station comprising:
   a receiver configured to receive a downlink signal transmitted from a base station wherein the downlink signal includes identification information specifying a resource to be used by the mobile station for transmission of an uplink signal wherein the resource corresponds with a dedicated signaling resource used by the mobile station for transmitting the uplink signal;
   a processor configured to determine the dedicated signaling resource based on the identification information, wherein the dedicated signaling resource is an uplink resource; and
   a transmitter configured to determine a parameter which is used for generating a reference signal sequence by using the identification information and transmit the reference signal sequence generated by using the parameter to the base station using the dedicated signaling resource, wherein the parameter is associated with a group number of the reference signal sequence, and wherein the group number indicated by a group number index is a number used for generation of a data unit, the group number obtained as a result of demodulation of a reference signal (RS) of a control channel, and the group number is based on the closest remote radio head (RRH) specified by a position of the mobile station so that the base station uses the same group number regardless of a type of a channel as long as the mobile station does not move.

7. A wireless communication method in a wireless communication system including a base station and a mobile station configured to perform communication with the base station, the wireless communication method comprising:

selecting, by the base station, identification information, which is allocated for the mobile station, specifying a resource from among a plurality of resources to allocate a dedicated signaling resource to be used by the mobile station for transmission of an uplink signal; and transmitting, by the base station, to the mobile station, a downlink signal wherein the downlink signal includes the identification information specifying the dedicated signaling resource;

receiving, by the mobile station, the transmitted downlink signal;

determining a parameter which is used for generating a reference signal sequence by using the identification information; and transmitting the reference signal sequence generated by using the parameter to the base station using the dedicated signaling resource, wherein the parameter is associated with a group number of the reference signal sequence, and wherein the group number indicated by a group number index is a number used for generation of a data unit, the group number obtained as a result of demodulation of a reference signal (RS) of a control channel, and the group number is based on the closest remote radio head (RRH) specified by a position of the mobile station so that the base station uses the same group number regardless of a type of a channel as long as the mobile station does not move.

8. The wireless communication system according to claim 1, wherein the dedicated signaling resource is selected from a Physical Uplink Control Channel (PUCCH) or a Physical Uplink Shared Channel (PUSCH).

9. The base station according to claim 5, wherein the dedicated signaling resource is selected from a Physical Uplink Control Channel (PUCCH) or a Physical Uplink Shared Channel (PUSCH).

10. The mobile station according to claim 6, wherein the dedicated signaling resource is selected from a Physical Uplink Control Channel (PUCCH) or a Physical Uplink Shared Channel (PUSCH).

11. The wireless communication method of claim 7, wherein the dedicated signaling resource is selected from a Physical Uplink Control Channel (PUCCH) or a Physical Uplink Shared Channel (PUSCH).

* * * * *